US009594931B2

(12) United States Patent
Yamachika

(10) Patent No.: US 9,594,931 B2
(45) Date of Patent: Mar. 14, 2017

(54) CARD CONNECTOR

(71) Applicant: HOSIDEN CORPORATION, Yao-shi (JP)

(72) Inventor: Naoki Yamachika, Yao (JP)

(73) Assignee: HOSIDEN CORPORATION, Yao-shi (JP)

( * ) Notice: Subject to any disclaimer, the term of this patent is extended or adjusted under 35 U.S.C. 154(b) by 0 days.

(21) Appl. No.: 14/921,439

(22) Filed: Oct. 23, 2015

(65) Prior Publication Data

US 2016/0126648 A1 May 5, 2016

(30) Foreign Application Priority Data

Oct. 31, 2014 (JP) .................. 2014-222642

(51) Int. Cl.
*H01R 13/635* (2006.01)
*G06K 13/08* (2006.01)
*G06K 7/00* (2006.01)

(52) U.S. Cl.
CPC .................. *G06K 7/0047* (2013.01)

(58) Field of Classification Search
CPC ... H01R 13/635; G06K 13/08; G06K 13/0806
USPC ........................ 439/159, 157, 160
See application file for complete search history.

(56) References Cited

U.S. PATENT DOCUMENTS

| 8,231,395 | B2 * | 7/2012 | Li | G06K 7/0021 |
| | | | | 439/159 |
| 8,460,020 | B2 * | 6/2013 | Hsiao | H01R 12/7005 |
| | | | | 439/159 |
| 2001/0055897 | A1 * | 12/2001 | Nogami | G06K 13/0825 |
| | | | | 439/159 |
| 2004/0127079 | A1 * | 7/2004 | Nagata | E05C 19/022 |
| | | | | 439/159 |
| 2005/0208805 | A1 * | 9/2005 | Kodera | G06K 13/08 |
| | | | | 439/159 |
| 2005/0272290 | A1 | 12/2005 | Yoneyama | |
| 2006/0183361 | A1 * | 8/2006 | Kan | G06K 7/0021 |
| | | | | 439/159 |
| 2006/0258197 | A1 * | 11/2006 | Chen | G06K 13/0806 |
| | | | | 439/159 |
| 2007/0010114 | A1 * | 1/2007 | Zhao | H01R 13/635 |
| | | | | 439/159 |

(Continued)

FOREIGN PATENT DOCUMENTS

JP 4050299 B2 2/2008

*Primary Examiner* — Gary Paumen
(74) *Attorney, Agent, or Firm* — Kratz, Quintos & Hanson, LLP

(57) ABSTRACT

A card connector including a body, a slider in the body, an urging member, and a cover. The body has a slot for insertion and removal of a card. The slider is slidable, together with the card, at least between a first position and a second position inside the body. The second location is on a card removal direction side relative to the first position. The urging member is configured to urge the slider located at the first position in the removal direction. The cover includes a cover body, which is fixed to the body so as to cover the slot, and a flat spring, which extends from the cover body. At least part of the flat spring is so disposed inside the body as to be elastically abuttable on the slider, on the removal direction side relative to the first position, from a card insertion direction side.

21 Claims, 10 Drawing Sheets

(56) References Cited

U.S. PATENT DOCUMENTS

| | | | | |
|---|---|---|---|---|
| 2007/0032108 | A1* | 2/2007 | Hsu | H01R 13/635 439/159 |
| 2008/0160808 | A1* | 7/2008 | Hsiao | G06K 13/0825 439/160 |
| 2008/0182441 | A1* | 7/2008 | Kiryu | H01R 13/631 439/159 |
| 2009/0035971 | A1* | 2/2009 | Tsuji | G06K 7/0021 439/159 |
| 2010/0093200 | A1* | 4/2010 | Ye | H01R 13/635 439/159 |
| 2011/0306224 | A1* | 12/2011 | Guo | G06K 13/08 439/159 |
| 2012/0021626 | A1* | 1/2012 | Zhang | G06K 7/003 439/159 |
| 2012/0094514 | A1* | 4/2012 | Sun | H01R 13/62 439/159 |
| 2013/0005168 | A1* | 1/2013 | Ye | G06K 13/08 439/159 |
| 2013/0040478 | A1* | 2/2013 | Hsu | G06K 13/085 439/159 |

* cited by examiner

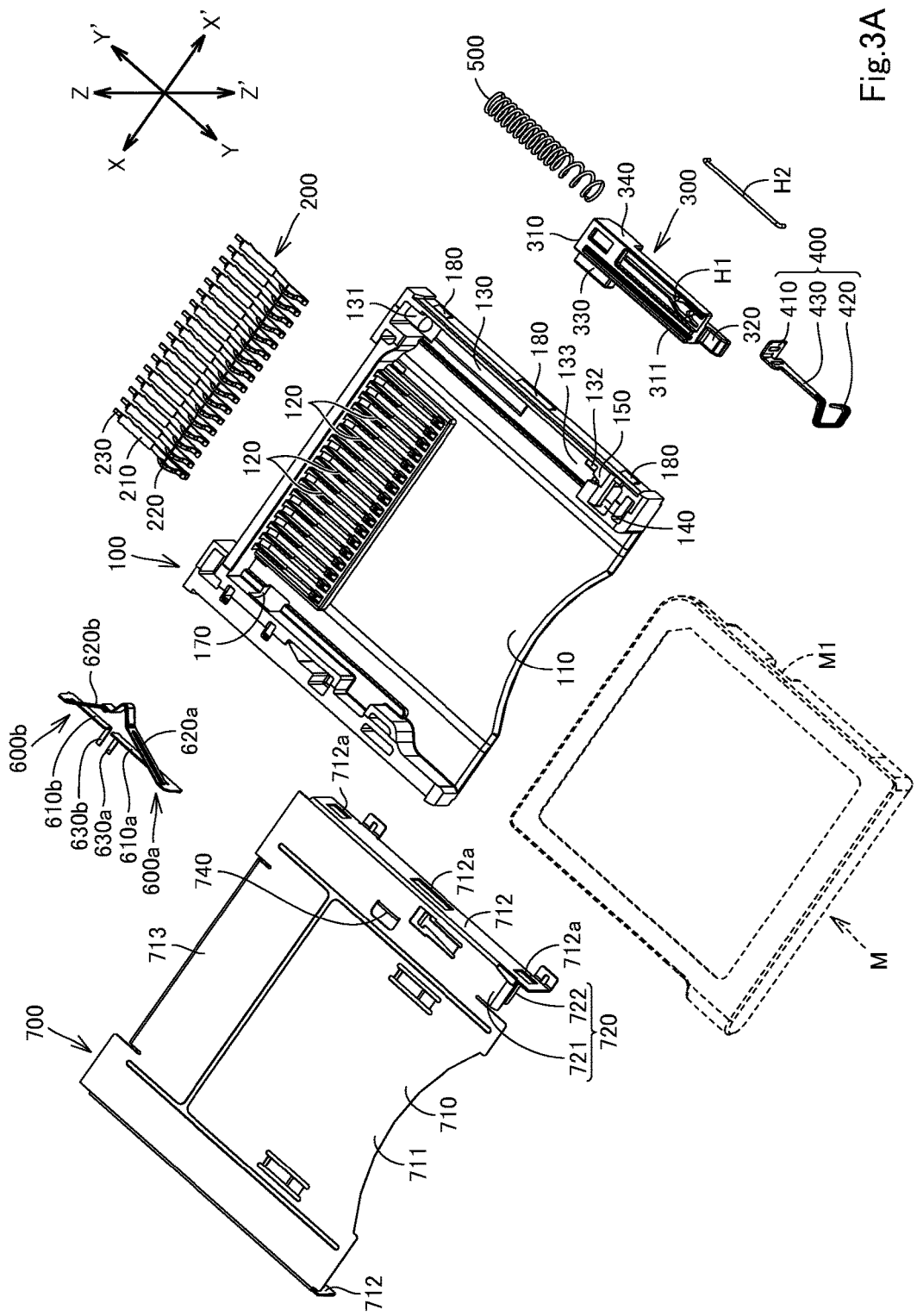

CARD CONNECTOR

CROSS-REFERENCE TO RELATED APPLICATIONS

The present application claims priority under 35 U.S.C. §119 of Japanese Patent Application No. 2014-222642 filed on Oct. 31, 2014, the disclosure of which is expressly incorporated by reference herein in its entity.

BACKGROUND OF THE INVENTION

Technical Field

The invention relates to card connectors.

Background Art

A conventional card connector is described in Japanese Patent No. 4050299. The card connector includes a body, a slider assembly, a first spring, a second spring, and a cover. The body has a slot for insertion and removal of a card. The slider assembly can slide, together with the card, from a first position to a third position beyond a second position inside the body. The first position is a position where the card inserted into the slot is connected to the card connector. The second position is a position where the card can be removed out of the slot. The third position is a position where the card is prevented from springing out of the slot. The first spring urges the slider assembly located at the first position toward the third position. When the slider assembly is located at the third position, the second spring elastically abuts on the slider assembly to bring back the slider assembly to the second position. The cover is attached to the body to cover the slider assembly, the first spring, and the second spring.

SUMMARY OF INVENTION

The card connector requires the two coil springs, resulting in a large number of components.

The invention is devised in view of the circumstances and provides a card connector with a reduced number of components.

A card connector in an aspect of the invention includes a body, a slider, an urging member, and a cover. The body has a slot for insertion and removal of a card. The slider is provided in the body so as to be slidable, together with the card, at least between a first position and a second position inside the body. The second location is on a card removal direction side relative to the first position. The urging member is configured to urge the slider located at the first position in the removal direction. The cover includes a cover body and a flat spring. The cover body is fixed to the body so as to cover the slot. The flat spring extends from the cover body. At least part of the flat spring is so disposed inside the body as to be elastically abuttable on the slider, on the removal direction side relative to the first position, from a card insertion direction side.

The card connector of this aspect can be fabricated with a reduced number of components for the following reasons. The slider, urged by the urging member, moves from the first position to the second position. During this movement, the flat spring of the cover elastically abuts on the slider, on the removal direction side relative to the first position, making it possible to suppress the momentum to move the slider in the removal direction. Therefore, the number of components for the card connector can be reduced by elastic components, such as coil springs, for suppressing the above momentum.

The at least so part of the flat spring may be disposed in the body as to be elastically abuttable on the slider located at the second position, from the card insertion direction side.

The slider may include an engaging portion engageable with an engaging recess of the card. The engaging portion may be at least partially displaceable in a disengagement direction in which the engaging portion is disengaged from the engaging recess. The body may further include an allowing space inside the body. The allowing space may allow the engaging portion to be displaced in the disengagement direction when the slider is located at the second position.

The card connector of this aspect can be readily removed out of the card connector when the slider is located at the second position. This is because the engaging portion is displaced in the disengagement direction in the allowing space when the slider is located at the second position, allowing easy disengagement of the engaging portion from the engaging recess of the card.

The slider may be slidable to a third position beyond the second position inside the body. The third position may be located on the removal direction side relative to the second position. The body may further include an abuttable portion. The abuttable portion may be provided on the removal direction side relative to the allowing space of the body and may be configured to abut on the engaging portion from the disengagement direction side when the slider is located at the third position so as to disable displacement of the engaging portion in the disengagement direction. The flat spring of the cover may be elastically deformable in the removal direction when pressed in the removal direction by the slider sliding from the second position to the third position.

The card connector of this aspect has the following technical features and effects. First, it is possible to prevent the card from springing out in the removal direction. More particularly, when the slider is located at the third position, the abuttable portion abuts on the engaging portion from the disengagement direction side, disabling displacement of the engaging portion in the disengagement direction. As a result, the engagement between the engaging portion and the engaging recess of the card is maintained, preventing the card from springing out in the removal direction. Second, it is possible to suppress the momentum to move the slider in the removal direction beyond the second position. This is because the flat spring of the cover elastically deforms so as to apply a load on the slider in the insertion direction.

The third position may not be a position on the removal direction side relative to the second position, but a position between the first position and the second position in the body, rather than. In this case, the allowing space and the abuttable portion may be configured as follows: the allowing space may allow displacement of the engaging portion in the disengagement direction when the slider is located at the third position; and the abuttable portion may abut on the engaging portion from the disengagement direction side when the slider is located at the second position to disable displacement of the engaging portion in the disengagement direction.

The card connector of this aspect has the following technical features and effects. First, it is possible to prevent the card from springing out in the removal direction. More particularly, when the slider is located at the second position, the abuttable portion abuts on the engaging portion from the disengagement direction side, disabling displacement of the engaging portion in the disengagement direction. As a result, the engagement between the engaging portion and the engaging recess of the card is maintained, preventing the card from springing out in the removal direction. Second, the card can be readily removed out of the card connector when the slider is located at the third position. This is because the engaging portion is displaced in the disengagement direction in the allowing space when the slider is located at the third position, allowing easy disengagement of the engaging portion from the engaging recess of the card.

The abuttable portion may include a first face on a side of a direction opposite to the disengagement direction, a second face on the insertion direction side, and a corner at which the first face meets the second face. The positional relationship between the engaging portion and an imaginary line extending in the removal direction along the first face of the abuttable portion may be such that: 1) the engaging portion is partially located on the disengagement direction side relative to the imaginary line; 2) the engaging portion is abuttable on the second face; and 3) when the slider moves from the second position to the third position, the engaging portion can ride up over the corner and abut on the first face.

The card connector of this aspect can reduce the possibility that the slider moves to the third position beyond the second position. When the slider moves from the first position to the second position, the slider elastically abuts on the flat spring, and the engaging portion partially abuts on the second face of the abuttable portion.

The flat spring may include a basal portion and a distal portion. The basal portion may be a plate extending from the cover body in the removal direction. The distal portion may extend contiguously from and at an angle to the basal portion. The distal portion of the flat spring may be elastically abuttable on the slider located at the second position. The basal portion of the flat spring may be elastically deformable in a direction away from the body due to pressure on the distal portion of the flat spring applied by the slider abutting on the distal portion.

The card connector of this aspect has following technical features and effects. It is possible to prolong the life of the flat spring because of reduced load. The slider abuts on and applies load on the distal portion of the flat spring, but such load can be absorbed by elastic deformation of the basal portion and the distal portion of the flat spring.

The distal portion of the flat spring may be elastically deformable in the removal direction when pressed in the removal direction by the slider sliding from the second position to the third position. In this case, the basal portion of the flat spring may be elastically deformable in a direction away from the body due to pressure on the distal portion of the flat spring applied by the slider pressing the distal portion.

The card connector of this aspect has the following technical features and effects. First, it is possible to further suppress the momentum to move the slider in the removal direction beyond the second position. This is because the basal portion and the distal portion of the flat spring of the cover elastically deform and thereby apply a load on the slider in the insertion direction. Second, it is possible to prolong the life of the flat spring because of reduced load. The slider abuts on and applies load on the distal portion of the flat spring, but such load can be absorbed by elastic deformation of the basal portion and the distal portion of the flat spring.

The body may further include a housing portion and a receiving hole. The housing portion may adjoin the slot in the body and house the slider in a slidable manner. The receiving hole may be provided on the removal direction side relative to the housing portion in the body. The receiving hole may receive the distal portion of the flat spring.

The card connector of this aspect can assembled with ease. When the cover body of the cover is attached to the body, the distal portion of the flat spring can also be inserted into the receiving hole. It is thus possible to attach the cover body to the body and place the flat spring into the body at a time.

The body may further include a support portion and a communicating hole. The support portion may be provided between the housing portion and the receiving hole of the body to support the basal portion of the flat spring. The communicating hole may extend through the support portion of the body such that the housing portion communicates with the receiving hole through the communicating hole. The slider may further include a projection. The projection may be configured to be received in the receiving hole through the communicating hole and elastically abuttable on the distal portion of the flat spring.

In the card connector of this aspect, the flat spring is supported on the support portion. This configuration can reduce wobbling of the flat spring due to external vibrations or shocks applied to the card connector.

The slot and the receiving hole may open to one side of a crossing direction that crosses the removal direction and the insertion direction. The cover body may cover the slot from the one side of the crossing direction. The distal portion of the flat spring may extend from the basal portion to the other side of the crossing direction and may be received in the receiving hole from the one side of the crossing direction.

The card connector of this aspect can be assembled more easily for the following reason. When the cover body of the cover is attached to the body from one side of the crossing direction, the distal portion of the flat spring is inserted into the receiving hole from the one side of the crossing direction.

BRIEF DESCRIPTION OF DRAWINGS

FIG. 3A is a front, top, left side exploded perspective view of the card connector, and a front, top, left side perspective view of the card.

Figure 1A:
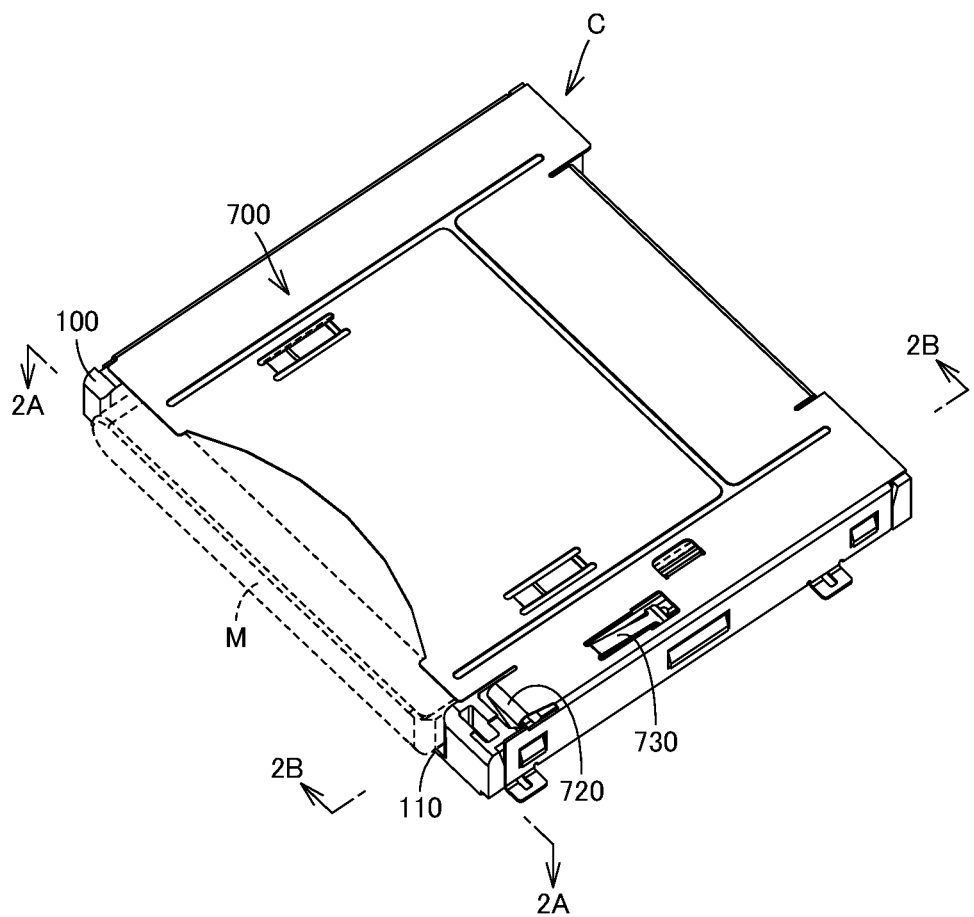
FIG. 1A is a front, top, left side perspective view of a card connector and a card connected thereto in accordance with an embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the card connector and its constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

A card connector C in an embodiment of the invention will be described below with reference to FIG. 1A to FIG. 5B. The card connector C is a connector connectable to a card M. The card connector C and the card M will be described below in detail. The Y-Y' direction indicated in FIG. 2A to FIG. 5B correspond to the direction in which the card M is inserted into or removed from the card connector C. The Y direction corresponds to the "removal direction" of the card defined in the claims. The Y' direction corresponds to the "insertion direction," which is the direction opposite to the removal direction, of the card defined in the claims. The X-X' direction indicated in FIG. 2A, FIG. 3A to FIG. 3B, FIG. 4A, and FIG. 5A correspond to the widthwise direction of the card connector C. The X-X' direction in this embodiment crosses the Y-Y' direction at right angles. The X' direction corresponds to the "disengagement direction" of an engaging portion defined in the claims. The Z-Z' direction indicated in FIG. 2B, FIG. 3A to FIG. 3B, FIG. 4B, and FIG. 5B correspond to the "crossing direction" defined in the claims and also correspond to the thickness direction of the card connector C. The Z-Z' direction in this embodiment crosses the Y-Y' direction and the X-X' direction at right angles. The Z direction corresponds to "one side of the crossing direction" defined in the claims, and the Z' direction corresponds to "the other side of the crossing direction" defined in the claims.

Figure 3B:
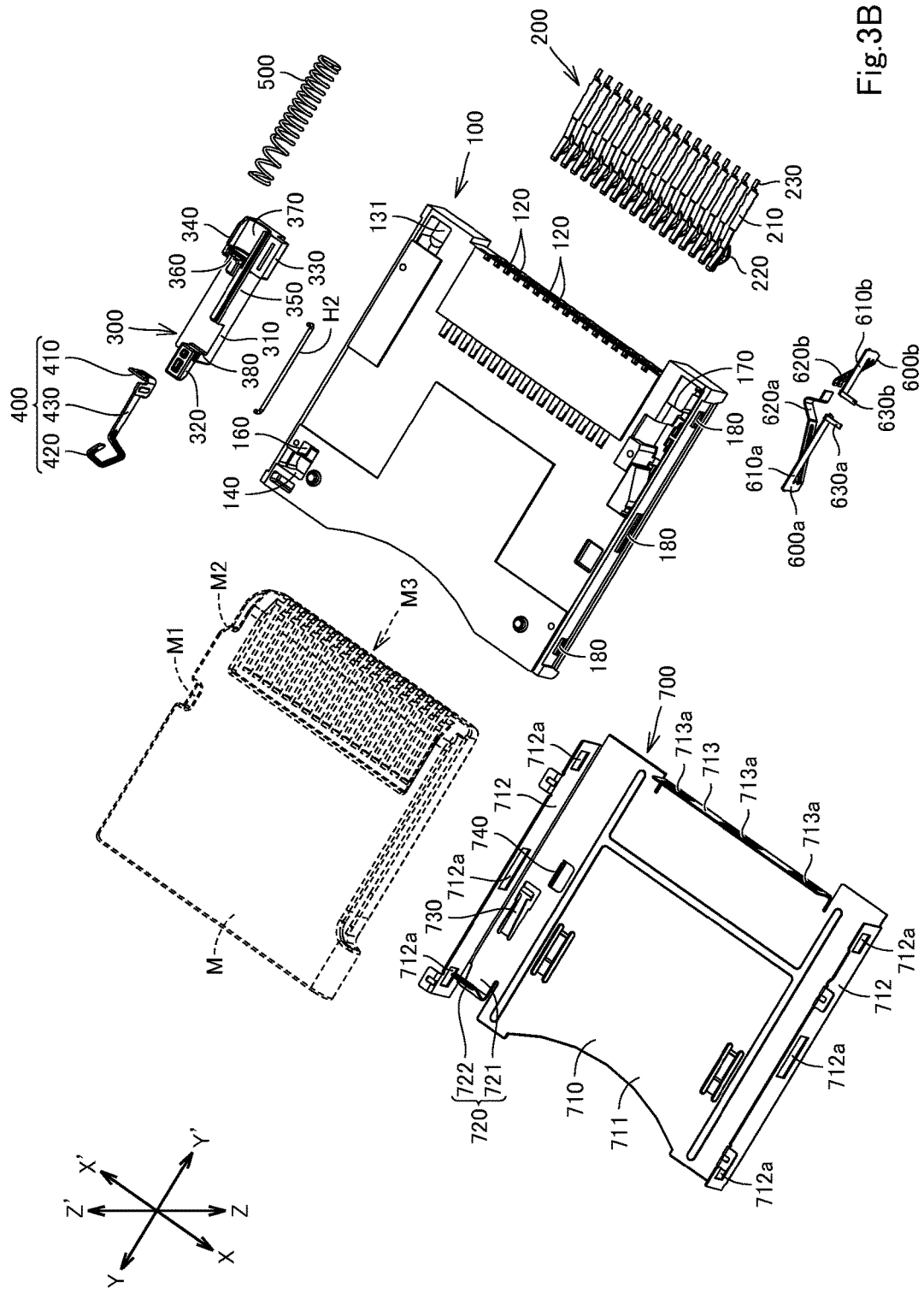
FIG. 3B is a back, bottom, right side exploded perspective view of the card connector, and a back, bottom, right side perspective view of the card.

The card M may be an IC card, a PC card, an SIM card, an SD card, a mini SD card, etc. As best illustrated in FIG. 3B, the card M has an engaging recess M1, a fitting recess M2, and a plurality of electrodes M3. The engaging recess M1 is centrally provided in the X' direction end portion of the card M. The fitting recess M2 is provided in the X' and Y' direction corner of the card M. The electrodes M3 are spaced from each other along the X-X' direction, along the Y' direction end portion of the Z' direction end face (bottom face) of the card M.

The card connector C includes a body 100, a plurality of terminals 200, a slider 300, an urging member 500, a heart-cam mechanism H, a first switch terminal 600a, a second switch terminal 600b, and a cover 700.

Figure 1C:
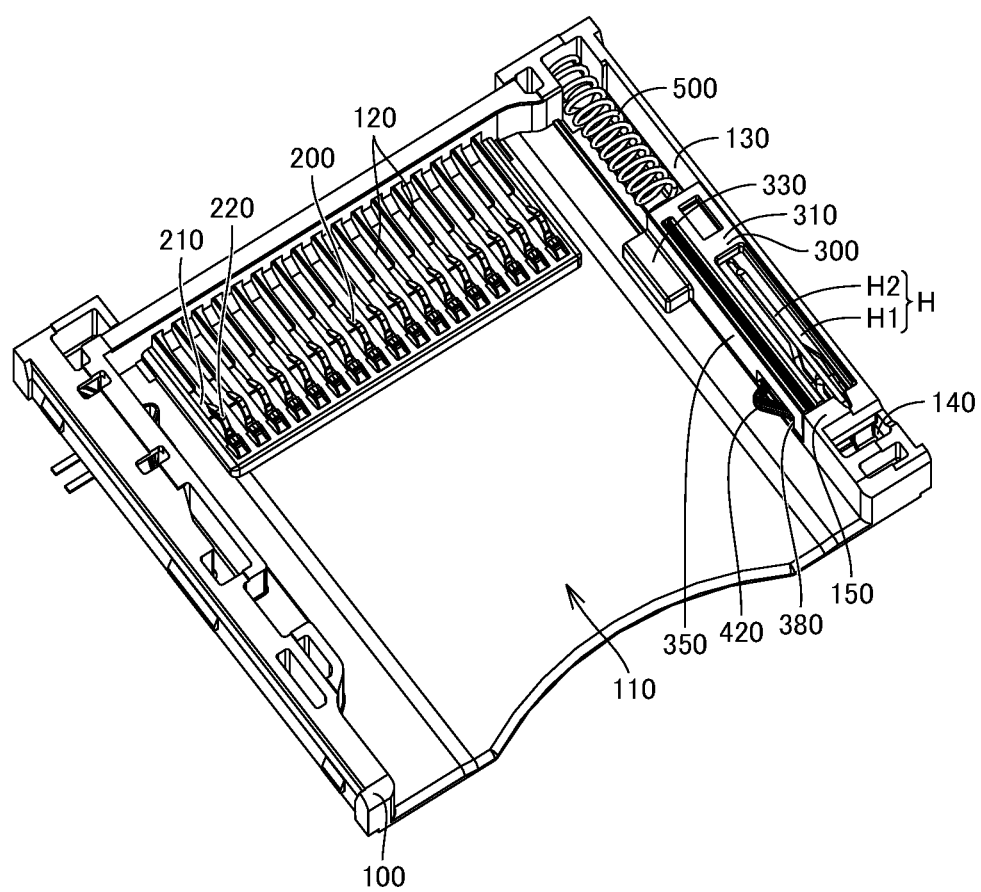
FIG. 1C is a front, top, right side perspective view of the card connector with its cover removed, in which a slider of the card connector is located at a third position.
Figure 2A:
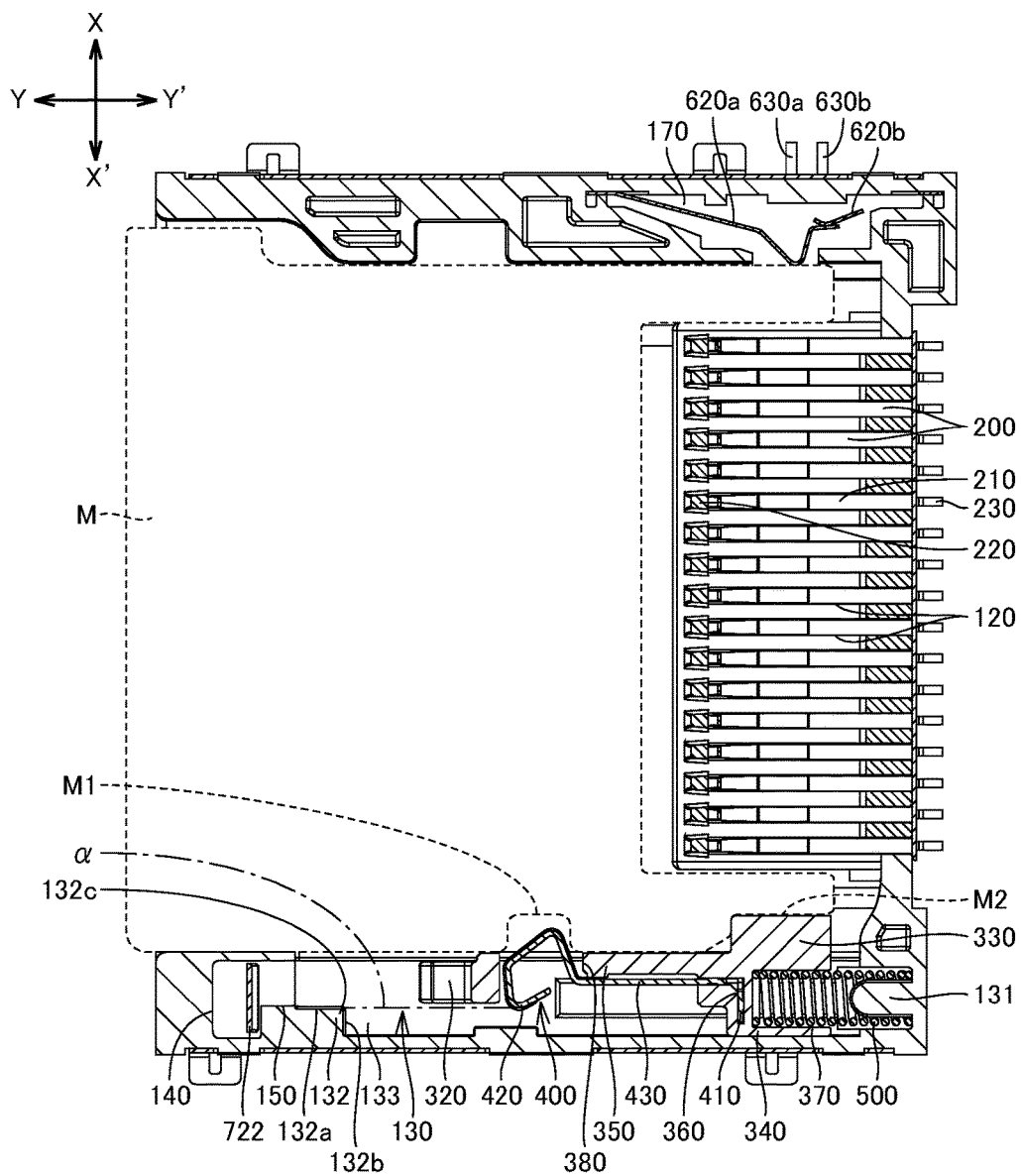
FIG. 2A is a sectional view of the card connector and the card, taken along 2A-2A in FIG. 1A, in which the slider of the card connector is located at a first position.

The body 100 is made of an insulating resin. As best illustrated in FIG. 1C, FIG. 2A, and FIG. 3B, the body 100 has a slot 110, a plurality of holding grooves 120, a first housing portion 130, an receiving hole 140, a support portion 150, a communicating hole 160, a second housing portion 170, a plurality of first engaging protrusions 180, a plurality of second engaging protrusions (not shown), an X-direction-side outer face, an X'-direction-side outer face, and a Y'-direction-side outer face. The first housing portion 130 corresponds to the "housing portion" defined in the claims.

Figure 2B:
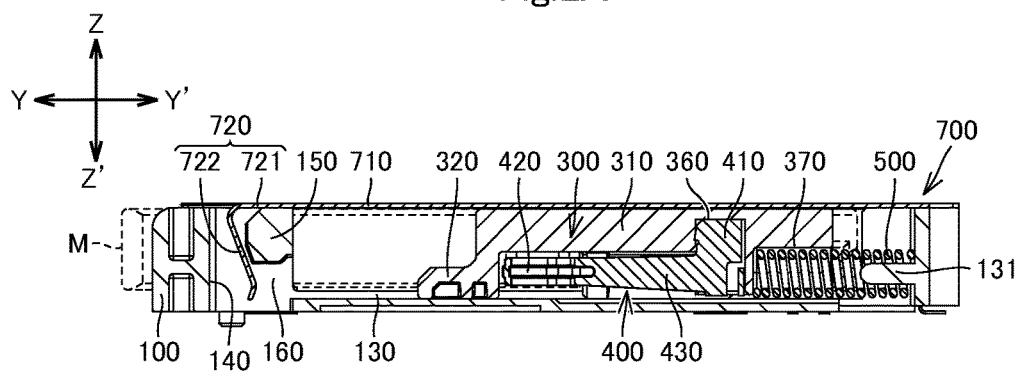
FIG. 2B is a sectional view of the card connector and the card taken along 2B-2B in FIG. 1A, in which the slider of the card connector is located at the first position.
Figure 4A:
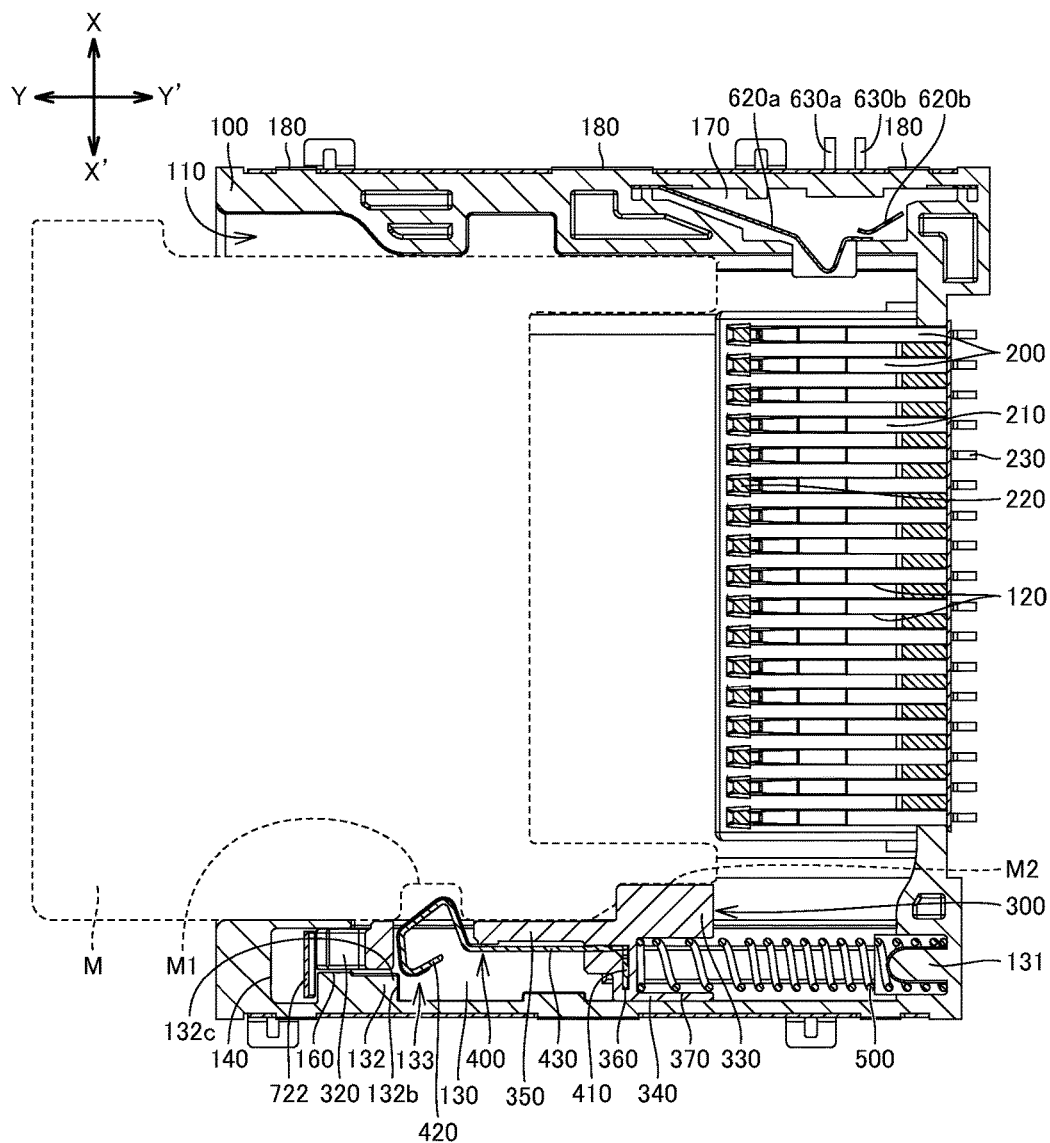
FIG. 4A is a sectional view of the card connector and the card corresponding to FIG. 2A, in which the slider of the card connector is located at a second position.
Figure 4B:
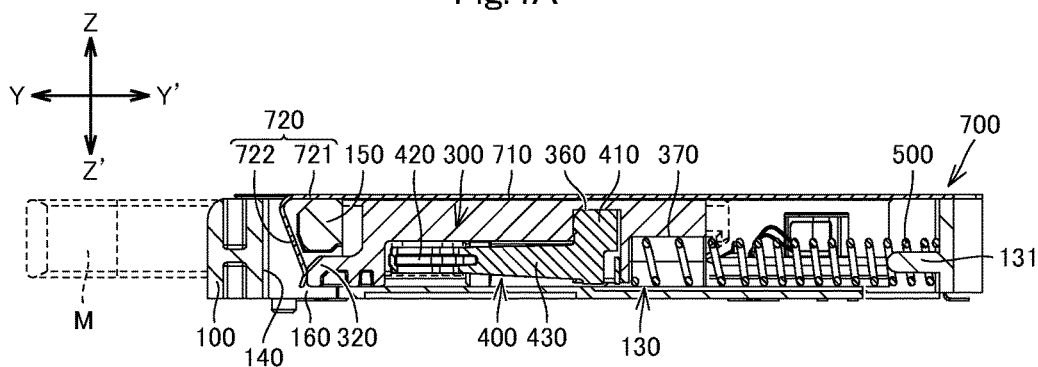
FIG. 4B is a sectional view of the card connector and the card corresponding to FIG. 2B, in which the slider of the card connector is located at the second position.
Figure 5A:
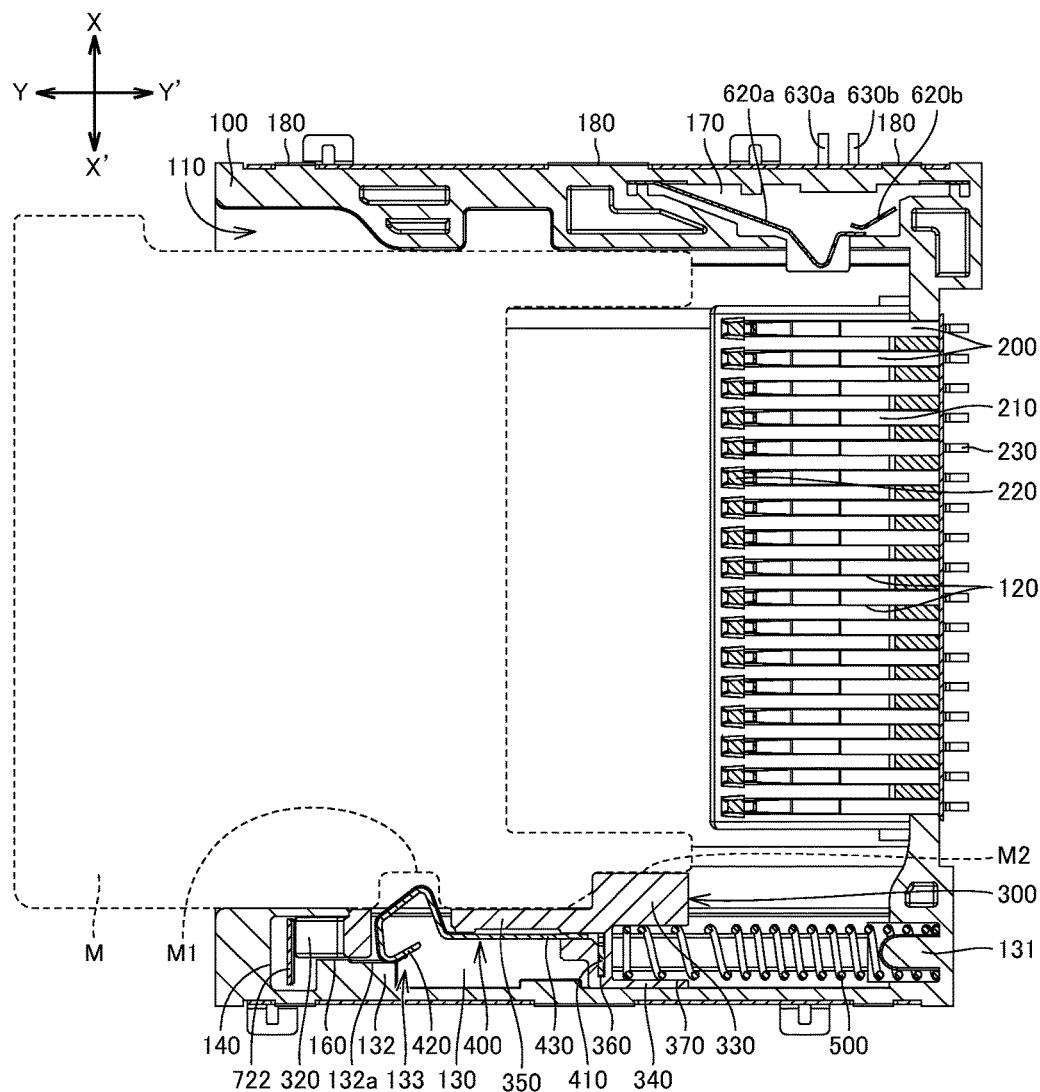
FIG. 5A is a sectional view of the card connector and the card corresponding to FIG. 2A, in which the slider of the card connector is located at the third position.
Figure 5B:
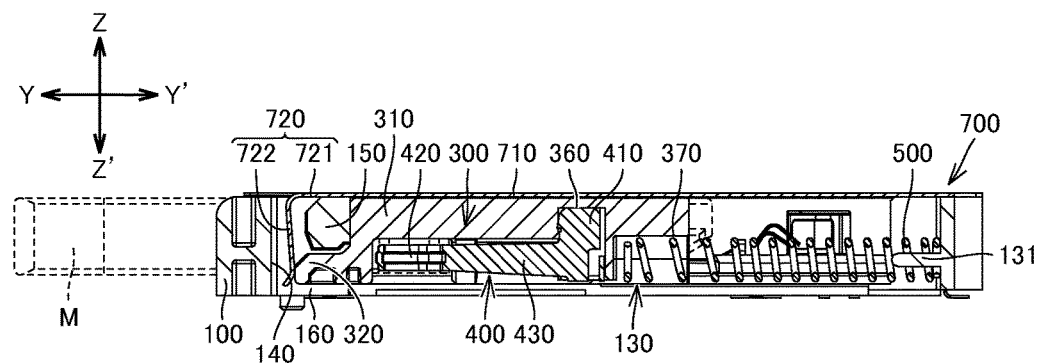
FIG. 5B is a sectional view of the card connector and the card corresponding to FIG. 2B, in which the slider of the card connector is located at the third position.

The slot 110 is a recess in the body 100. The slot 110 opens in the Y and Z directions. The slot 110 has a Z'-direction face and a Y'-direction-side wall. The slot 110 has an X-X' direction dimension corresponding to that of the card M, a Z-Z' direction dimension corresponding to that of the card M, and a Y-Y' direction dimension smaller than that of the card M. The slot 110 of such dimensions allow the card M to be inserted into and removed from the slot 110 in the Y-Y' direction. It should be appreciated that FIG. 2A and FIG. 2B illustrate the card M located at a connection position, at which the card M is connected to the card connector C. FIG. 4A and FIG. 4B illustrate the card M located at a removable position, at which the card M can be removed out of the slot 110 of the card connector C. FIG. 5A and FIG. 5B illustrate the card M as located at a spring-out prevention position, at which the card M is prevented from springing out of the slot 110.

As best illustrated in FIG. 3A, the holding grooves 120 are spaced along the X-X' direction in the Z'-direction face (bottom face) of the slot 110. The holding grooves 120 are long grooves extending in the Y-Y' direction and passing through the Y'-direction-side wall of the slot 110.

The first housing portion 130 is a recess on the X'-direction side relative to the slot 110 of the body 100. The first housing portion 130 communicates with the slot 110, extends in the Y-Y' direction, and opens in the Z direction. The first housing portion 130 is recessed in the Z' direction more deeply than the slot 110. The first housing portion 130 has a Y'-direction-side wall, a Y-direction portion, a column 131, an abuttable portion 132, and an allowing space 133.

As best illustrated in FIG. 2A, the column 131 extends in the Y direction from the Y'-direction-side wall of the first housing portion 130. The abuttable portion 132 is a rectangular block on the X'-direction-side of the Y-direction portion of the first housing portion 130. The abuttable portion 132 has a first face 132a on the X direction side (the side opposite to the disengagement direction), a second face 132b on the Y' direction side (the insertion direction side), and a corner 132c. The corner 132c of the abuttable portion 132 is the corner where the first face 132a meets the second face 132b. The allowing space 133 is provided on the Y' direction side relative to the abuttable portion 132 of the first housing portion 130. In other words, the abuttable portion 132 is located on the Y direction side (removal direction side) relative to the allowing space 133. The allowing space 133 has an X-X' direction dimension larger, by the nonexistence of the abuttable portion 132, than the X-X' direction dimension of the Y-direction portion of the first housing portion 130.

As best illustrated in FIG. 2A and FIG. 2B, the receiving hole 140 of the body 100 is provided on the Y direction side relative to the first housing portion 130. The receiving hole 140 extends through the body 100 in the Z-Z' direction. That is, the receiving hole 140 opens in the Z and Z' directions. The support portion 150 is a wall between the first housing portion 130 and the receiving hole 140 of the body 100. The communicating hole 160 is a through hole extending in the Y-Y' direction through the Z'- and X-direction portion of the support portion 150. The communicating hole 160 is located on the X direction side relative to the abuttable portion 132. The first housing portion 130 communicates with the receiving hole 140 through the communicating hole 160. The communicating hole 160 has an X-X' direction dimension smaller than that of the first housing portion 130. The communicating hole 160 has a Z-Z' direction dimension smaller than that of the first housing portion 130.

Figure 1B:
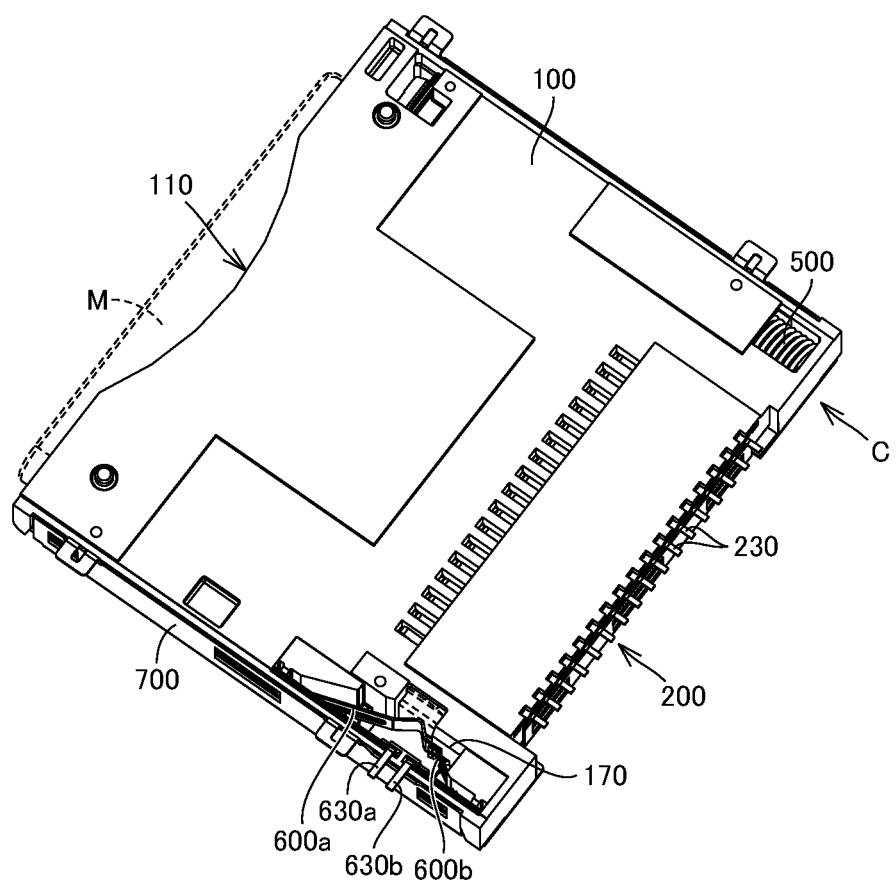
FIG. 1B is a back, bottom, right side perspective view of the card connector and the card connected thereto.

As best illustrated in FIG. 1B, the second housing portion 170 is a recess on the X-direction side relative to the slot 110 of the body 100. The second housing portion 170 opens in the Z' direction and also has an opening in the X' direction. As illustrated in FIG. 2A, the second housing portion 170 communicates with the slot 110 though the opening in the X' direction.

As best illustrated in FIG. 3A, the first engaging protrusions 180 are spaced in the Y-Y' direction on the outer faces on the X- and X'-direction sides of the body 100. Although not shown, the second engaging protrusions are spaced in the X-X' direction on the outer face on the Y' direction side of the body 100.

The terminals 200 are made of a metal plate. As best illustrated in FIG. 3A and FIG. 3B, the terminals 200 each include a fixing plate 210, a contact portion 220, and a tail 230. The fixing plate 210 extends in the Y-Y' direction. The fixing plate 210 includes a Y-direction end and a Y'-direction end. The contact portion 220 is contiguous with the Y-direction end of the fixing plate 210 and is bent over so as to extend in the Z direction and then in the Y direction. The contact portion 220 is so curved as to protrude in the Z direction in the middle. The tail 230 is a plate contiguous with the Y'-direction end of the fixing plate 210 and extends in the Y-Y' direction.

The fixing plates 210 of the terminals 200 are held in the respective holding grooves 120. The spacing between the holding grooves 120 corresponds to the spacing between the electrodes M3 of the card M, so that the terminals 200 are accordingly positioned corresponding to the respective electrodes M3. The contact portions 220 of the terminals 200 protrude in the Z direction from the respective holding grooves 120. The contact portions 220 are adapted to contact the respective electrodes M3. When the card M is at the connecting position mentioned above, the respective electrodes M3 of the card M are brought into contact with the contact portions 220 of the terminals 200, whereby the card connector C is electrically connected with the card M. The tails 230 of the terminals 200 protrude in the Y' direction from the respective holding grooves 120. The tails 230 are adapted for connection with respective first electrodes of a circuit board (not shown).

The first switch terminal 600a and the second switch terminal 600b are terminals of a position-detecting switch to detect whether the card M is located at the connecting position. The second switch terminal 600b is made of a metal plate. As illustrated in FIG. 2A, the second switch terminal 600b is housed in the second housing portion 170 of the body 100. As best illustrated in FIG. 3A and FIG. 3B, the second switch terminal 600b includes a base 610b, a slope 620b, and a connecting portion 630b. The base 610b is a generally L-shaped plate. The base 610b includes a first plate and a second plate. The first plate of the base 610b extends in the Y-Y' direction. The second plate of the base 610b extends in the Z direction from the Y'-direction portion of the first plate. The Y'-direction portion of the first plate and the second plate of the base 610b are press-fitted in a press-fit groove in the Y'-direction side of the second housing portion 170. The connecting portion 630b is a plate extending in the X direction from the Y-direction portion of the first plate of the base 610b and protrudes from the second housing portion 170 (see FIG. 2A). The connecting portion 630b is adapted for connection with one of a pair of second electrodes of the circuit board. The slope 620b is a plate extending from the second plate of the base 610b so as to slope in a direction including components of the Y and X' directions. The slope 620b has a free end portion and is elastically deformable in the X-X' direction.

The first switch terminal 600a is made of a metal plate. As best illustrated in FIG. 3A and FIG. 3B, the first switch terminal 600a includes a base 610a, a slope 620a, and a connecting portion 630a. The base 610a is a generally L-shaped plate. The base 610a includes a first plate and a second plate. The first plate of the base 610a extends in the Y-Y' direction. The second plate of the base 610a extends in the Z direction from the Y-direction portion of the first plate. The Y-direction portion of the first plate and the second plate of the base 610a are press-fitted in a press-fit groove in the Y-direction side of the second housing portion 170. The connecting portion 630a is a plate extending in the X direction from the Y'-direction portion of the first plate of the base 610a and protrudes from the second housing portion 170 (see FIG. 2A). The connecting portion 630a is adapted for connection with the other one of the second electrodes of the circuit board. The slope 620a is a plate extending from the second plate of the base 610a so as to slope in a direction including components of the Y' and X' directions. The slope 620a is elastically deformable in the X-X' direction. The slope 620a has a free end portion generally bent in a V-shape protruding in the X' direction (hereinafter referred to as a bent portion). The bent portion of the slope 620a is inserted into the slot 110 through the opening in the X' direction of the second housing portion 170. The bent portion of the slope 620a is to be pressed in the X direction by the card M as located at the connecting position. When the bent portion of the slope 620a is pressed in the X direction by the card M, the slope 620a elastically deforms in the X direction. The tip of the free end portion of the slope 620a faces the tip of the free end portion of the slope 620b with a clearance on the X' direction side. When the slope 620a elastically deforms in the X direction, the tip of the free end portion of the slope 620a is brought into contact with the tip of the free end portion of the slope 620b. This contact turns on the position-detecting switch, thereby detecting that the card M is located at the connecting position.

As illustrated in FIG. 1C, FIG. 2A, FIG. 2B, and FIG. 4A to FIG. 5B, the slider 300 is housed in the first housing portion 130 in a slidable manner in the Y-Y' direction. More specifically, the slider 300 can slide, together with the card M, in the Y-Y' direction inside the first housing portion 130, between a first position (see FIG. 2A and FIG. 2B) and a third position (see FIG. 5A and FIG. 5B). Between the first position and the third position of the first housing portion 130A is defined a second position (see FIG. 4A and FIG. 4B). The first position is the position of the slider 300 in the first housing portion 130 taken when the card M is located at the connecting position. The second position is the position of the slider 300 in the first housing portion 130 taken when the card M is located at the removable position. The second position is located on the Y direction side relative to the first position. The third position is the position of the slider 300 taken when the card M is located at the spring-out prevention position. The third position is located on the Y direction side relative to the second position.

As best illustrated in FIG. 3A and FIG. 3B, the slider 300 has a main body 310, a projection 320, a protrusion 330, a block 340, a guide plate 350, a fixing groove 360, a housing recess 370, and a window 380. The main body 310, the projection 320, the protrusion 330, the block 340, and the guide plate 350 are integrally formed of an insulating resin.

The main body 310 is a rectangular parallelepiped block extending in the Y-Y' direction. The main body 310 has a Z-direction face, a Z'-direction face, an X'-direction face, and a Y-direction portion face. A guide groove 311 extends in the Y-Y' direction along the X-direction end of the Z-direction face of the main body 310. When the slider 300 is located at the third position, the Y-direction face of the main body 310 can abut the support portion 150 of the body 100 (see FIG. 5B).

The guide plate 350 is a plate extending in the Y-Y' direction along the X-direction end of the Z'-direction face of the main body 310. The guide plate 350 includes an X-direction face, an X'-direction face, and a Y'-direction portion.

The block 340 is provided on the Z'-direction face of the main body 310, more particularly on the X' direction side relative to the guide plate 350. The block 340 is integral with the Y'-direction portion of the guide plate 350. The block 340 includes an X'-direction face, a Y-direction portion, and a Y'-direction portion. The X-X' direction distance from the X-direction face of the guide plate 350 to the X'-direction faces of the main body 310 and the block 340 is substantially the same as or slightly smaller than the X-X' direction dimension of the first housing portion 130 of the body 100. Accordingly, the main body 310 and the block 340 can slide in the Y-Y' direction on and along the X'-direction-side wall of the first housing portion 130, and the guide plate 350 can slide in the Y-Y' direction along the X-direction-side edge of the first housing portion 130 of the body 100 (see FIG. 2A, FIG. 4A, and FIG. 5A).

The Y-direction portion of the block 340 is provided with the fixing groove 360. The fixing groove 360 is generally of L-shape and opens in the Y and Z' directions. The Y'-direction portion of the block 340 is provided with the housing recess 370. The housing recess 370 is generally semicircular prism shaped and opens in the Z' and Y' directions. The housing recess 370 receives the Y-direction portion of the urging member 500, which is a coil spring. The Y'-direction portion of the urging member 500 is in contact with the Y'-direction-side wall of the first housing portion 130. Inserted through the Y'-direction portion of the urging member 500 is the column 131 of the first housing portion 130. The urging member 500 is thus interposed between the slider 300 and the Y'-direction-side wall of the first housing portion 130. When the slider 300 is located at the first position, the urging member 500 is compressed between the slider 300 and the Y'-direction-side wall of the first housing portion 130. The urging force of the urging member 500 allows the slider 300 at the first position to return in the Y direction (removal direction).

The protrusion 330 is a rectangular parallelepiped part on the X-direction face of the guide plate 350. As best illustrated in FIG. 1C, the protrusion 330 is movable in the Y-Y' direction inside the slot 110. As illustrated in FIG. 2A, FIG. 4A, and FIG. 5A, the protrusion 330 has an outer shape corresponding to the shape of the fitting recess M2 of the card M. The protrusion 330 can fit in the fitting recess M2 of the card M, thereby making the slider 300 slidable in the Y-Y' direction together with the card M.

As best illustrated in FIG. 3B, the projection 320 is provided on the Z'-direction face of the main body 310, more particularly on the Y direction side relative to the guide plate 350 with a clearance therebetween. The projection 320 is a generally L-shaped block protruding in the Y direction side further than the Y-direction face of the main body 310. The projection 320 has an X-X' direction dimension smaller than that of the main body 310 and slightly smaller than that of the communicating hole 160 of the body 100 in the X-X' direction. The projection 320 can enter the receiving hole 140 through the communicating hole 160 of the body 100 (see FIG. 4B and FIG. 5B) when the slider 300 is located at the second position or the third position. The clearance between the projection 320 and the guide plate 350 forms the window 380.

The slider 300 further includes an engaging portion 400. The engaging portion 400 is a lock spring of metal housed in the first housing portion 130 of the body 100 so as to be movable in the Y-Y' direction together with the slider 300. As illustrated in FIG. 2A to FIG. 5B, the engaging portion 400 includes a fixing portion 410, a hook 420, and an arm 430. The fixing portion 410 is a generally L-shaped plate. The fixing portion 410 fits in the fixing groove 360 of the block 340 of the slider 300 and is thereby fixed to the block 340 of the slider 300. The arm 430 is a plate extending in the Y-Y' direction and couples between the fixing portion 410 and the hook 420. The arm 430 is disposed along the X'-direction face of the guide plate 350 of the slider 300. The arm 430 is elastically deformable in the X-X' direction. The hook 420 is a plate bent in a hook shape and displaceable in the X-X' direction in accordance with elastic deformation of the arm 430. The hook 420 has a first V-portion and a second V-portion. The first V-portion of the hook 420 is bent in the X direction to form a generally V-shape and protrudes in the X direction from the window 380 of the slider 300 so as to be received in the slot 110 of the body 100. The first V-portion of the hook 420 is engageable with the engaging recess M1 of the card M. The second V-portion of the hook 420 is bent in the X' direction to form a generally V-shape. The positional relationship between the second V-portion of the hook 420 and an imaginary line α that extends in the Y-Y' direction along the first face 132a of the abuttable portion 132 of the body 100 (see FIG. 2A) is as follows: 1) the apex of the second V-portion of the hook 420 is located on the X' direction side relative to the imaginary line α; 2) the second V-portion of the hook 420 is abuttable on the second face 132b of the abuttable portion 132; and 3) when the slider 300 moves from the second position to the third position, the second V-portion of the hook 420 can ride up over the corner 132c of the abuttable portion 132 and abut the first face 132a.

When the slider 300 is located at the second position, the hook 420 is disposed in the allowing space 133 of the body 100, so that the hook 420 can be displaced in the X' direction (disengagement direction in the claims). In other words, the engaging portion 400 is partially displaceable in the X' direction inside the allowing space 133. When the card M moves in the Y direction, the Y'-direction edge of the engaging recess M1 of the card M presses the first V-portion of the hook 420. The pressing causes the hook 420 to be displaced in the X' direction inside the allowing space 133 so as to disengage the engaging recess M1 of the card M from the first V-portion of the hook 420, allowing the card M at the removable position to be removed out of the slot 110 of the body 100. It should be appreciated from the foregoing that when the slider 300 is located at the second position in the first housing portion 130, the hook 420 of the engaging portion 400 is located in the allowing space 133.

When the slider 300 is located at the third position, the second V-portion of the hook 420 abuts on the first face 132a of the abuttable portion 132 from the X direction side. In other words, the abuttable portion 132 abuts on the second Y'-portion of the hook 420 from the X' direction side. This abutment prevents displacement in the X' direction of the hook 420 and maintains engagement between the first V-portion of the hook 420 and the engaging recess M1 of the card M. This arrangement can prevent the card M at the spring-out prevention position from springing out of the slot 110 of the body 100, resisting the urging force by the urging member 500 to move the card M further in the Y direction together with the slider 300. It should be appreciated from the foregoing that when the slider 300 is located at the third position in the first housing portion 130, the hook 420 of the engaging portion 400 abuts the abuttable portion 132.

The heart-cam mechanism H includes a cam groove H1 and a pin H2 of generally U-shape. As best illustrated in FIG. 1C, the cam groove H1 extends in the Z-direction face of the main body 310. The pin H2 has lengthwise first and second portions. The first portion of the pin H2 is rotatably supported by the support portion 150 of the body 100. The second end of the pin H2 is received in the cam groove H1 so as to be movable in and along the cam groove H1 in accordance with movement of the slider 300. When the slider 300 is pressed in the Y' direction further than the first position, the cam groove H1 secures the second portion of the pin H2 in position. When the slider 300 is pressed again in the Y' direction, the cam groove H1 releases the second portion of the pin H2.

The cover 700 is made of a metal plate. As best illustrated in FIG. 3A and FIG. 3B, the cover 700 includes a cover body 710, a flat spring 720, a retaining plate 730, and a guide 740. The cover body 710 is attached to the body 100 so as to cover the slot 110 and the first housing portion 130 of the body 100 from the Z direction side. The cover body 710 includes a main plate 711, a pair of side plates 712, and a back plate 713. The main plate 711 is a rectangular plate. The main plate 711 has an X-X' direction dimension slightly larger than that of the body 100. The main plate 711 has an X-direction portion, an X'-direction end, a Y-direction end, and a Y'-direction end. One of the side plates 712 extends in the Z' direction from the X-direction end of the main plate 711 and abuts the X-direction-side outer face of the body 100. The other side plate 712 extends in the Z' direction from the X'-direction portion of the main plate 711 and abuts the X'-direction-side outer face of the body 100. The side plates 712 each have a plurality of engaging holes 712a spaced in the Y-Y' direction. The back plate 713 extends in the Z' direction from the Y'-direction end of the main plate 711 and abuts the Y'-direction-side outer face of the body 100. The back plate 713 has a plurality of engaging holes 713a spaced in the X-X' direction. The engaging holes 712a are engaged with the respective first engaging projections 180 of the body 100, the engaging holes 713a are engaged with the respective second engaging projections of the body 100, and the cover body 710 is thereby attached to the body 100.

The flat spring 720 is formed integrally with the main plate 711. The flat spring 720 is a generally V-shaped plate, including a basal portion 721 and a distal portion 722. The basal portion 721 is a plate extending in the Y direction from the X'-direction end portion of the Y direction end of the main plate 711. The basal portion 721 is located on and supported by the support portion 150. The distal portion 722 is a plate extending from the Y-direction end of the basal portion 721, in a direction including components of the Z' and Y' directions. In other words, the distal portion 722 extends contiguously from and at an angle to the basal portion 721. The distal portion 722 is received in the receiving hole 140 of the body 100. The distal portion 722 is elastically abuttable on the projection 320 of the slider 300 at the second position. The distal portion 722 can elastically deform in the Y direction (removal direction) when pressed by the projection 320 of the slider 300 moving from the second position to the third position. The pressure on the distal portion 722 applied by the projection 320 of the slider 300 can cause the basal portion 721 to elastically deform in the Z direction (direction away from the body 100). The elastic deformation of the distal portion 722 and the basal portion 721 of the flat spring 720 suppresses the momentum to move the slider 300 in the Y direction provided by the urging member 500, resulting in that the slider 300 is pushed back from the third position to the second position. It should be appreciated that FIG. 5B does not show the elastic deformation of the basal portion 721 in the Z direction.

The retaining plate 730 is a plate formed by cutting a portion corresponding to the heart-cam mechanism H of the flat spring 720 of the main plate 711. The retaining plate 730 slopes in a direction including components of the Z' and Y' directions. The retaining plate 730 elastically abuts the pin H2 of the heart-cam mechanism H to prevent the pin H2 from rising in the Z direction.

The guide 740 is a plate formed by cutting a portion of the main plate 711 that corresponds to the guide groove 311 of the slider 300. The guide 740 is bent to extend in the Z' direction. The guide 740 has a thickness in the X-X' direction slightly smaller than that of the guide groove 311. The guide 740 is received in the guide groove 311 so as to be movable in the Y-Y' direction. This stabilizes movement of the slider 300 in the Y-Y' direction.

The card connector C configured as described above can be assembled in the following steps. First, the body 100 and the terminals 200 are prepared. The terminals 200 are inserted into the respective holding grooves 120 of the body 100, so that the terminals 200 are held in the body 100 at intervals in the X-X' direction. The first switch terminal 600a and the second switch terminal 600b are also prepared. The first switch terminal 600a is placed into the second housing portion 170 of the body 100 so as to be held by the body 100. At this point, the bent portion of the slope 620a of the first switch terminal 600a is placed into the slot 110 through the X'-direction-side opening of the second housing portion 170. The second switch terminal 600b placed into in the second housing portion 170 of the body 100 so as to be held by the body 100. Then, the tip of the free end portion of the slope 620b faces the tip of the free end portion of the slope 620a with a clearance on the X direction side.

The slider 300 is also prepared. The fixing portion 410 of the engaging portion 400 is held in the fixing groove 360 of the slider 300. The engaging portion 400 is thereby disposed on the Z'-direction side relative to the main body 310 of the slider 300. Specifically, the arm 430 of the engaging portion 400 is located on the X'-direction side relative to the guide plate 350 of the slider 300, and the hook 420 of the engaging portion 400 partially protrudes in the X direction from the window 380 of the slider 300.

The urging member 500 is also prepared. The Y-direction portion of the urging member 500 is inserted into the housing recess 370 of the slider 300. In this state, the column 131 of the first housing portion 130 of the body 100 is inserted into the Y'-direction portion of the urging member 500, and the Y'-direction portion of the urging member 500 is brought into abutment with the Y'-direction-side wall of the first housing portion 130. Then, the urging member 500, the slider 300, and the engaging portion 400 are placed into the first housing portion 130 while compressing the urging member 500 between the slider 300 and the Y'-directionside wall of the first housing portion 130. At this point, the protrusion 330 of the slider 300 and the first V-portion of the hook 420 of the engaging portion 400 are disposed inside the slot 110.

The cover 700 is also prepared. In the state where the urging member 500 is compressed and the slider 300 is located on the Y'-direction side relative to the second position, the cover body 710 is attached to the body 100 such that the cover body 710 of the cover 700 covers the slot 110 and the first housing portion 130 of the body 100 from the Z direction side. Simultaneously, the basal portion 721 of the flat spring 720 is placed on the support portion 150 of the body 100 from the Z direction side, and the distal portion 722 of the flat spring 720 is inserted into the receiving hole 140 of the body 100 from the Z direction side. After that, the urging member 500 is released. Then, the urging force in the Y direction on the slider 300 applied by the urging member 500 is balanced by the urging force in the Y' direction applied by the flat spring 720, so that the slider 300 is kept at the second position. The card connector C is thus assembled.

The card connector C can be connected to the card M in the following steps. First, A user inserts the card M into the slot 110 of the card connector C. Then, the hook 420 of the engaging portion 400 is pressed by the Y-direction-side wall of the fitting recess M2 of the card M in the X' direction and is displaced to the X' direction side in the allowing space 133, and the arm 430 elastically deforms to the X' direction side. Then, the protrusion 330 of the slider 300 at the second position fits in the fitting recess M2 of the card M, and the hook 420 of the engaging portion 400 of the card connector C is displaced in the X direction and moves into the engaging recess M1 of the card M. As a result, the arm 430 returns to the original state, so that the hook 420 engages with the engaging recess M1.

Then, the user moves the card M from the removable position to the connecting position and then presses the card M in the Y' direction beyond the connecting position. In accordance with this operation, the slider 300 and the engaging portion 400 are moved from the second position to the first position and then pressed to the Y' direction side beyond the first position. This causes the heart-cam mechanism H to work and holds the slider 300 in position, i.e. at the first position. While the card M moves to the connecting position, the electrodes M3 of the card M are brought into contact with the respective terminals 200. Simultaneously, the card M presses the bent portion of the slope 620a in the X direction. This pressure deforms the slope 620a elastically in the X direction, so that the tip of the slope 620a is brought into contact with the tip of the slope 620b, turning on the position-detecting switch. While the slider 300 moves from the second position to the first position, the urging member 500 is compressed between the slider 300 and the Y'-direction-side wall of the first housing portion 130. The card M is now connected to the card connector C at the connecting position.

The card M can be taken out of the card connector C in the following steps. First, a user presses the card M in the Y' direction beyond the connecting position. This causes the heart-cam mechanism H to release the slider 300.

In a case where the urging member 500 provide such a force as to move the slider 300 and the engaging portion 400 from the first position to the second position, the card M is pressed by the protrusion 330 of the slider 300 and moves, together with the slider 300, from the connecting position to the removable position. When the card M moves from the connecting position in the Y direction, the slope 620a returns to its original form and moves in the X' direction, and the tip of the slope 620a moves away from the tip of the slope 620b. This turns off the position-detecting switch.

When the slider 300 reaches to the second position, the projection 320 of the slider 300 moves into the receiving hole 140 through the communicating hole 160 of the body 100 and elastically abuts the flat spring 720 of the cover 700. Simultaneously, the hook 420 of the engaging portion 400 abuts on the second face 132b of the abuttable portion 132 of the body 100. The hook 420 is thus located in the allowing space 133 of the body 100. When the user pulls the card M in the Y direction, the hook 420 is pressed by the Y'-direction-side edge of the engaging recess M1 of the card M and displaced in the X' direction side, and the arm 430 elastically deforms to the X' direction side. Accordingly, the card M at the removable position can be readily taken out of the slot 110.

In a case where the urging member 500 provide such a force as to move the slider 300 and the engaging portion 400 from the first position to the third position, the card M is pressed by the protrusion 330 of the slider 300 and moves, together with the slider 300, from the connecting position to the spring-out prevention position. When the card M moves from the connecting position in the Y direction, the position-detecting switch turns off as described above.

While the slider 300 moves from the second position to the third position, the projection 320 of the slider 300 moves into the receiving hole 140 through the communicating hole 160 of the body 100. The projection 320 accordingly presses and deforms the distal portion 722 of the flat spring 720 elastically in the Y direction and also deforms the basal portion 721 of the flat spring 720 elastically in the Z direction. This suppresses the momentum to move the slider 300, the engaging portion 400, and the card M in the Y direction. Simultaneously, the hook 420 of the engaging portion 400 is displaced to the X-direction side, riding up over the corner 132c of the abuttable portion 132 of the body 100, and the arm 430 elastically deforms to the X direction side. When the slider 300 reaches the third position, the first face 132a of the abuttable portion 132 of the body 100 abuts on the hook 420 of the engaging portion 400 from the X' direction side. This can prevent displacement of the hook 420 to the X' direction side and maintains engagement between the hook 420 and the engaging recess M1 of the card M. This means that the card M at the spring-out prevention position can be prevented from springing out of the slot 110 in the Y direction. Then, the basal portion 721 and the distal portion 722 of the flat spring 720 returns to the original state, bringing the slider 300 from the third position back to the second position. When the slider 300 reaches the second position, the hook 420 is located inside the allowing space 133, allowing the card M to move to the removable position. The card M can then be removed out of the slot 110 readily by pulling the card M in the Y direction as described above.

The card connector C configured as described above has at least the following technical features and effects. First, the card connector C can be fabricated with a reduced number of components because the flat spring 720 of the cover 700 does triple duty for the following functions 1) to 3). 1) The flat spring 720 elastically abuts on the slider 300 at the second position from the Y' direction side and thereby stops the slider 300 at the second position. 2) The flat spring 720 suppresses the momentum to move the slider 300 from the second position to the third position. 3) The flat spring 720 brings back the slider 300 from the third position to the second position. Therefore, the number of components for the card connector C can be reduced by elastic components, such as coil springs, for performing the above functions.

Second, the card connector C can be assembled with ease. This is because of a reduced number of components as described above. Moreover, when the cover body 710 of the cover 700 is attached to the body 100 from the Z direction side, the distal portion 722 of the flat spring 720 of the cover 700 can also be inserted into the receiving hole 140 of the body 100 from the Z direction side. It is thus possible to attach the cover body 710 to the body 100 and place the distal portion 722 of the flat spring 720 into the body 100 at a time.

Third, the card connector C can be minimized for the following reason. The body 100 requires a smaller space for housing the flat spring 720 of the cover 700, compared to spaces in the body that would be required for housing the elastic components mentioned above.

Fourth, the card connector C is configured such as to suitably suppress the momentum of the urging member 500 to move the slider 300 and the card M in the Y direction beyond the second position. Particularly, the slider 300, urged by the urging member 500, moves from the second position to the third position and presses the distal portion 722 of the flat spring 720, so that the distal portion 722 elastically deforms in the Y direction, in accordance with which the basal portion 721 of the flat spring 720 elastically deforms in the Z direction.

Fifth, the flat spring 720 is stably held in the card connector C. This is because the basal portion 721 of the flat spring 720 is supported on the support portion 150. This configuration can prevent wobbling of the flat spring 720 due to external vibrations or shocks applied to the card connector C.

The card connector of the invention is not limited to the embodiment described above but may be modified in any manner within the scope of the claims. Specific modifications will be described below.

The card of the invention can be any card that can be inserted into and removed out of a slot of the card connector of the invention. For example, the card may be any memory card of the kinds described above or of other kinds, or may be a read-only memory (ROM) card storing a game program or other data. The card of the invention may preferably, but not necessarily, have at least an engaging recess engageable with the engaging portion in the above embodiment or in the variants to be described.

The card connector of the invention may be modified in any manner as long as it includes a body, a slot, an urging member, and a cover in the above embodiment or in the variants to be described.

The body of the invention may be any member having a slot for insertion and removal of the card of any of the above aspects. The body may preferably, but not necessarily, have a (first) housing portion to house the slider in the above embodiment or the variants to be described in the body such that the slider is slidable, together with the card, in the insertion and removal directions of the card (first direction).

The first position and the second position of the body of the invention can be preferably, but not necessarily, defined in the (first) housing portion of the body. The first position may be at any position of the body or at any position in the (first) housing portion of the body. The second position may be at any position in the body or at any position in the (first) housing portion of the body if the second position is on a card removal direction side (on one side of the first direction) relative to the first position of any of the above aspects.

For example, the second position may be a position in the first housing portion where the slider is located when the card is located at the removable position where the card can be removed out of the slot. In this case, a third position can be defined in the first housing portion, on the removal direction side relative to the second position. The third position may be a position in the first housing portion taken by the slider when the card is located at the spring-out prevention position where the card is prevented from springing out of the slot. Alternatively, the second position may be position in the first housing portion taken by the slider when the card is located at the spring-out prevention position where the card is prevented from springing out of the slot. In this case, a third position may be defined between the first position and the second position in the first housing portion. The third position may be a position in the first housing portion taken by the slider when the card is located at the removable position where the card can be removed out of the slot.

The body of any of the above aspects may be provided with an allowing space to allow displacement in a disengagement direction of the engaging portion of the above embodiment or of the variants to be described when the card is located at the removable position and the slider is located at the second or third position. The disengagement direction is the direction in which the engaging portion is disengaged from the engaging recess of the card. The allowing space may preferably be provided in the (first) housing portion of the body. The body of any of the above aspects may be provided with an abuttable portion located on the removal direction side relative to the allowing space of any of the above aspects. The abuttable portion may abut the engaging portion from the disengagement direction side when the card is located at the spring-out prevention position and the slider is located at the third or second position so as to disable displacement of the engaging portion in the disengagement direction. The abuttable portion may preferably be provided in the (first) housing portion of the body.

The (first) housing portion of any of the above aspects may preferably be provided on one side of a second direction, which crosses the first direction, relative to the slot of the body of any of the above aspects. The (first) housing portion may preferably communicate with the slit.

The body of the invention may be provided without the second housing portion and/or the position-detecting switch. If provided, the second housing portion of the body of the invention may be modified in any manner as long as it is provided in the body of any of the above aspects and can house a position-detecting switch or position-detecting sensor capable of detecting that the card of any of the above aspects is located at the connecting position.

The body of the invention may be provided without the receiving hole. If provided, the receiving hole of the body of the invention may be any hole provided on the removal direction side relative to the first housing portion of the body of any of the above aspects. The receiving hole of the body of the invention can be integrated with the first housing portion of any of the above aspects. The receiving hole of any of the above aspects may be a bottomed hole. The receiving hole of any of the above aspects may open in the same direction as, or in a different direction from, the direction in which the slot of any of the above aspects opens. For example, the receiving hole of any of the above aspects may open to one side of the second direction. In this case, the flat spring may be contiguous with one of the side plates of the cover body and received in the receiving hole from either side of the second direction.

The body of the invention may be provided without the support portion and/or the communicating hole. If provided, the support portion of the body of the invention may be any portion of the body between the housing portion and the receiving hole. For example, the support portion need not support the basal portion of the flat spring. If provided, the communicating hole of the body of the invention may any hole passing through the support portion of the body of any of the above aspects such that the housing portion of any of the above aspects communicate with the receiving hole of any of the above aspects through the communicating hole.

The slider of the invention may be modified in any manner as long as it is provided in the body of any of the above aspects so as to be slidable at least between the first position and the second position in the body together with the card of any of the above aspects.

The slider of the invention may be provided without the projection, the protrusion, the guide plate, the block, the fixing groove, the housing recess, and/or the window. The main body of the slider of the invention may be housed in the first housing portion of any of the above aspects so as to be slidable in the insertion and removal directions of the card.

The urging member of the invention may be any elastic body that can urge the slider of any of the above aspects at the first position of any of the above aspects in the removal direction. For example, the urging member may be a coil spring as in the embodiment, a flat spring, a spring of any other type, or a rubber.

The slider of the invention may be provided without the engaging portion. If provided, the engaging portion of the slider of the invention may be any portion meeting the following conditions (1)-(3): (1) the engaging portion is provided on the slider of any of the above aspects; (2) the engaging portion can engage with the engaging recess of the card of any of the above aspects; and (3) the engaging portion can be at least partially displaced in the disengagement direction in which the engaging portion is disengaged from the engaging recess of the card of any of the above aspects. For example, the engaging portion may be provided on the main body of the slider of any of the above aspects such that the entire engaging portion can rotate in the disengagement direction, relative to the slider, in the allowing space of any of the above aspects. Alternatively, the engaging portion may be displaced in the allowing space of any of the above aspects in the disengagement direction together with the slider of any of the above aspects. In this case, the engaging portion may be made of a resin and integrated with the slider.

The cover of the invention may be modified in any manner as long as it has the cover body and the flat spring of any of the above aspects or of the variants to be described. The cover body of the invention may be modified in any manner as long as it is fixed to the body of any of the above aspects so as to cover the slot of any of the above aspects.

Figure 6A:
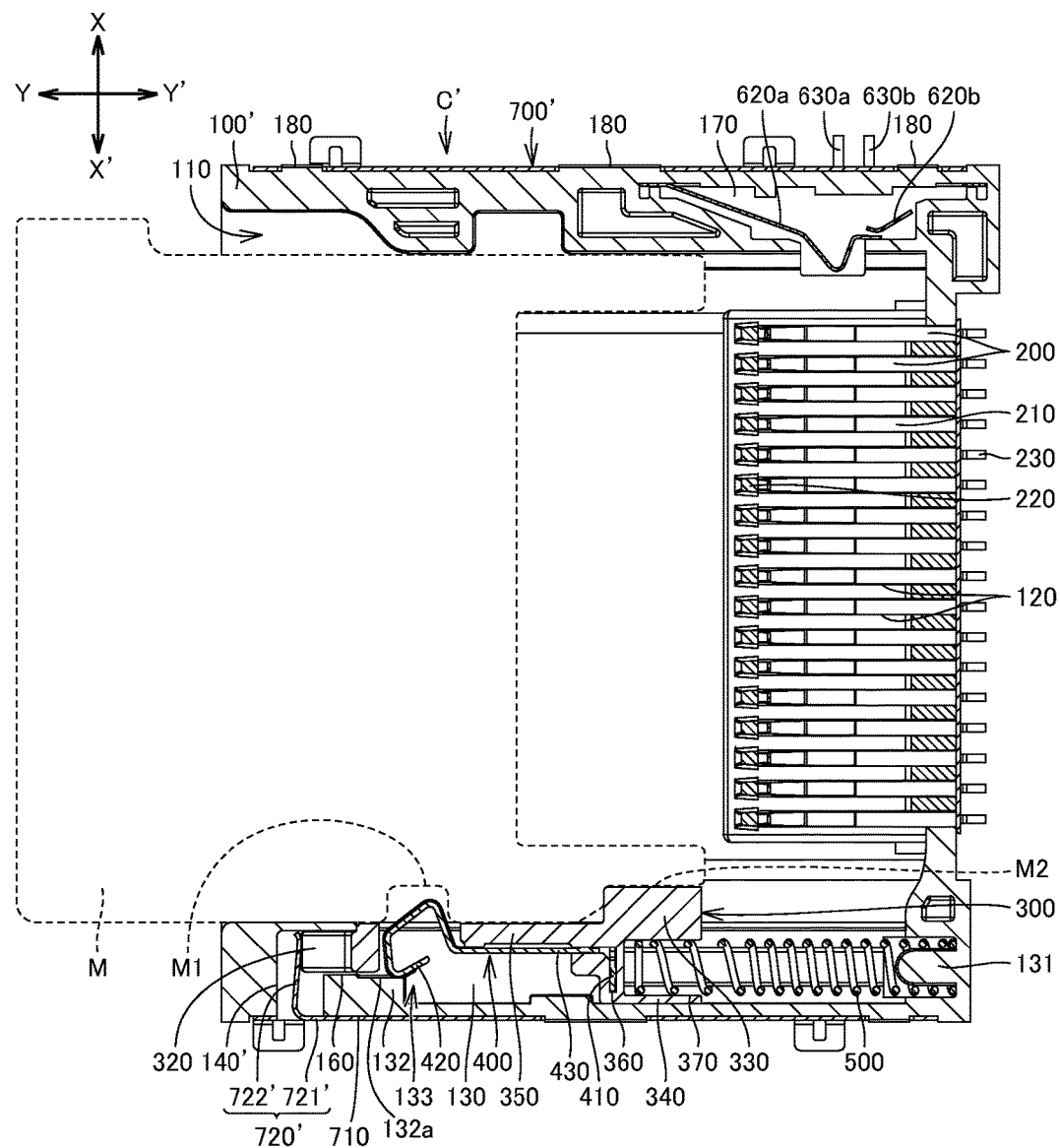
FIG. 6A is a sectional view of a first variant of the card connector, in which the slider of the card connector is located at the third position.
Figure 6B:
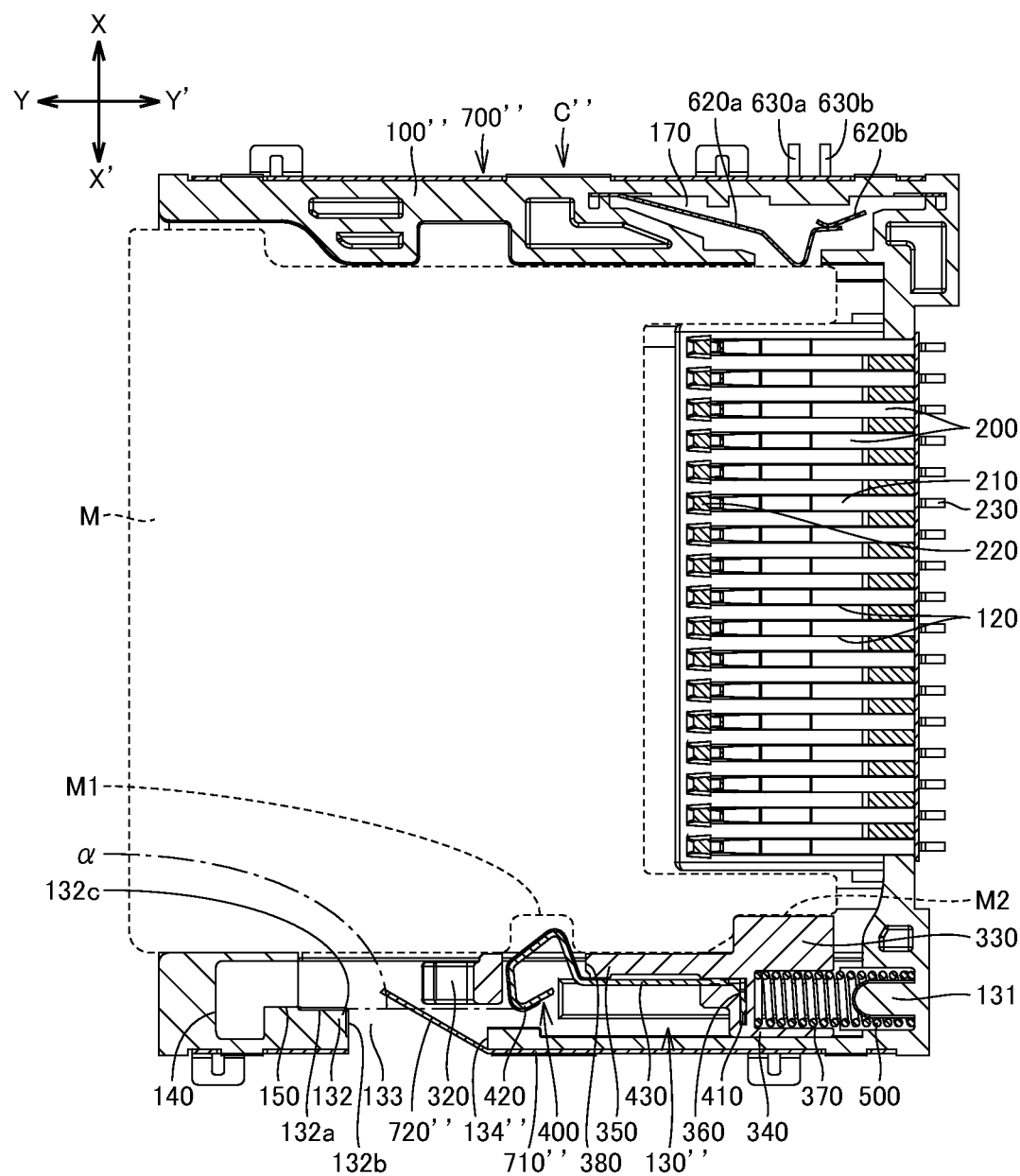
FIG. 6B is a sectional view of a second variant of the card connector, in which the slider of the card connector is located at the first position.

The flat spring of the cover of the invention may be any spring meeting the following conditions (1)-(3): (1) the flat spring is provided in the cover body of any of the above aspects; (2) the flat spring is disposed at least partly inside the body of any of the above aspects; and (3) the flat spring is at least partly abuttable elastically on the slider of any of the above aspects, on the removal direction side (one side of the first direction) relative to the first position of any of the above aspects, from the insertion direction side (the other side of the first direction). The flat spring of the cover of the invention may extend contiguously from and at an angle to the main plate or one of the side plates of the cover body and may be received in the receiving hole or the first housing portion of the body of any of the above aspects. FIG. 6A and FIG. 6B illustrate examples in which the flat spring is provided on a side plate of the cover body.

In a connector C' illustrated in FIG. 6A, a flat spring 720' of a cover 700' is contiguous with the Y-direction end portion of a side plate of the cover body 710. The flat spring 720', generally of the same shape as that of the flat spring 720 in the above embodiment, includes a basal portion 721' and a distal portion 722'. The basal portion 721' partially abuts the X'-direction face of a body 100'. The distal portion 722' is received in an receiving hole 140' of the body 100' from the X' direction side. Except for these differences, the basal portion 721' and the distal portion 722' have the same configuration as that of the basal portion 721 and the distal portion 722 in the above embodiment and therefore will not be further described. The receiving hole 140' is provided on the Y direction side relative to the first housing portion 130 of the body 100' and opens in the X' direction.

In a connector C" illustrated in FIG. 6B, a flat spring 720" of a cover 700" is a part of a side plate of a cover body 710". More particularly, the flat spring 720" is a metal plate extending from the side plate of the cover body 710" obliquely in a direction including components of components of the Y and X directions. When the slider 300 is located at the first position in a first housing portion 130" of a body 100", the flat spring 720" is located on the Y direction side relative to the slider 300 located. When the slider 300 moves from the first position to the second position, the flat spring 720" elastically abuts on the slider 300 from the Y' direction side. This abutment suppresses the momentum to move the slider 300 in the Y direction. The flat spring 720", in turn pressed by the slider 300, elastically deforms in the X' direction. The first housing portion 130" has an X'-direction-side opening 134" for receiving the flat spring 720". Except for the differences described above, the connectors C' and C" have the same configuration as that of the connector C in the above embodiment and therefore will not be further described.

The flat spring 720" may have a similar shape to that of the flat spring 720'. Alternatively, the flat spring 720 and/or 720' may have a similar shape to that of the flat spring 720".

The distal portion of the flat spring of the invention is only required to extend contiguously from and at an angle to the basal portion of the above embodiment or of the variants to be described. The distal portion of the flat spring of any of the above aspects may be disposed in the first housing portion or the receiving hole of any of the above aspects.

The basal portion of the flat spring of the invention may be omitted. If provided, the basal portion of the flat spring of the invention may be any plate-like portion extending from the cover body of any of the above aspects in the removal direction of the card. The basal portion of the flat spring of any of the above aspects may be disposed in the first housing portion or the receiving hole of any of the above aspects. The basal portion of the flat spring of any of the above aspects may elastically deform in a direction away from the body of any of the above aspects when subjected to a load applied to the distal portion of the flat spring of any of the above aspects.

The flat spring of any of the above aspects may elastically abut on the slider of any of the above aspects as located at the second position of any of the above aspects, from the insertion direction side (the other end of the first direction). Alternatively, the flat spring may elastically deform in the removal direction when pressed in the removal direction by the slider as sliding from the second position to the third position of any of the above aspects. The flat spring receives a load when abutted or pressed as described above. The flat spring of any of the above aspects may elastically abut on any part of the slider. For example, the flat spring of any of the above aspects may elastically abut on the main body or the engaging portion of the slider, on the removal direction side relative to the first position in the body. The flat spring of any of the above aspects may be connected integrally and contiguously to an end of the cover body or may be formed by cutting a part of the cover body.

The card connector of the invention may include at least one terminal that is held in the body of any of the above aspects and contactable with a corresponding electrode of the card inside the slot. For example, the terminal(s) may be insert-molded at the body. The heart-cam mechanism may be omitted in the invention.

It should be appreciated that the card connectors of the above embodiment and variants thereof are described above by way of examples only. The materials, shapes, dimensions, numbers, arrangements, and other configurations of the constituents of the card connectors may be modified in any manner if they can perform similar functions. The configurations of the embodiment and the variants described above may be combined in any possible manner.

REFERENCE SIGNS LIST

C: card connector
100: body
  110: slot
  120: holding groove
  130: first housing portion (housing portion in the claims
    131: column
    132: abuttable portion
    133: allowing space
  140: receiving hole
  150: support portion
  160: communicating hole
  170: second housing portion
  180: first engaging projection
200: terminal
300: slider
  310: main body
    311: guide groove
  320: projection
  330: protrusion
  340: block
  350: guide plate
  360: fixing groove
  370: housing recess
  380: window
  400: engaging portion
    410: fixing portion
    420: hook
    430: arm
500: urging member
600a: first switch terminal
600b: second switch terminal
700: cover
  710: cover body
    711: main plate
    712: side plate
    713: back plate
  720: flat spring
    721: basal portion
    722: distal portion
  730: retaining plate
  740: guide
H: heart-cam mechanism
  H1: cam groove
  H2: pin
M: card
  M1: engaging recess
  M2: fitting recess
  M3: electrode

The invention claimed is:

1. A card connector comprising:
a body having a slot for insertion and removal of a card;
a slider provided in the body so as to be slidable, together with the card, at least between a first position and a second position inside the body, the second location being on a card removal direction side relative to the first position;
an urging member configured to urge the slider located at the first position in the removal direction; and
a cover including:
a cover body fixed to the body so as to cover the slot, and
a flat spring extending from the cover body, at least part of the flat spring being so disposed inside the body as to be elastically abuttable on the slider, on the removal direction side relative to the first position, from a card insertion direction side.

2. The card connector according to claim 1, wherein
the at least so part of the flat spring is disposed in the body as to be elastically abuttable on the slider located at the second position, from the card insertion direction side.

3. The card connector according to claim 1, wherein
the slider includes an engaging portion engageable with an engaging recess of the card, the engaging portion being at least partially displaceable in a disengagement direction in which the engaging portion is disengaged from the engaging recess,
the body further includes an allowing space inside the body, the allowing space allows the engaging portion to be displaced in the disengagement direction when the slider is located at the second position.

4. The card connector according to claim 2, wherein
the slider is slidable to a third position beyond the second position inside the body, the third position being located on the removal direction side relative to the second position,
the slider includes an engaging portion being engageable with an engaging recess of the card and at least partially displaceable in a disengagement direction in which the engaging portion is disengaged from the engaging recess,
the body further includes an allowing space and an abuttable portion,
the allowing space is provided inside the body to allow displacement of the engaging portion in the disengagement direction when the slider is located at the second position,
the abuttable portion is provided on the removal direction side relative to the allowing space of the body, the abuttable portion being configured to abut on the engaging portion from the disengagement direction side when the slider is located at the third position so as to disable displacement of the engaging portion in the disengagement direction, and the flat spring of the cover is elastically deformable in the removal direction when pressed in the removal direction by the slider sliding from the second position to the third position.

5. The card connector according to claim 1, wherein
the slider includes an engaging portion engageable with an engaging recess of the card, the engaging portion being at least partially displaceable in a disengagement direction in which the engaging portion is disengaged from the engaging recess,
the body further includes an allowing space and an abuttable portion,
the allowing space is provided inside the body to allow displacement of the engaging portion in the disengagement direction when the slider is located at a third position between the first position and the second position, and
the abuttable portion is provided on the removal direction side relative to the allowing space of the body, the abuttable portion being configured to abut on the engaging portion from the disengagement direction side when the slider is located at the second position to disable displacement of the engaging portion in the disengagement direction.

6. The card connector according to claim 4, wherein
the abuttable portion includes:
a first face on a side of a direction opposite to the disengagement direction;
a second face on the insertion direction side; and
a corner at which the first face meets the second face,
the positional relationship between the engaging portion and an imaginary line extending in the removal direction along the first face of the abuttable portion is such that:
1) the engaging portion is partially located on the disengagement direction side relative to the imaginary line;
2) the engaging portion is abuttable on the second face; and
3) when the slider moves from the second position to the third position, the engaging portion can ride up over the corner and abut on the first face.

7. The card connector according to claim 1, wherein
the flat spring includes:
a basal portion being a plate extending from the cover body in the removal direction; and
a distal portion extending contiguously from and at an angle to the basal portion,
the distal portion of the flat spring is elastically abuttable on the slider located at the second position, and
the basal portion of the flat spring is elastically deformable in a direction away from the body due to pressure on the distal portion of the flat spring applied by the slider abutting on the distal portion.

8. The card connector according to claim 3, wherein
the flat spring includes:
a basal portion being a plate extending from the cover body in the removal direction; and
a distal portion extending contiguously from and at an angle to the basal portion,
the distal portion of the flat spring is elastically abuttable on the slider located at the second position, and
the basal portion of the flat spring is elastically deformable in a direction away from the body due to pressure on the distal portion of the flat spring applied by the slider abutting on the distal portion.

9. The card connector according to claim 5, wherein
the flat spring includes:
a basal portion being a plate extending from the cover body in the removal direction; and
a distal portion extending contiguously from and at an angle to the basal portion,
the distal portion of the flat spring is elastically abuttable on the slider located at the second position, and
the basal portion of the flat spring is elastically deformable in a direction away from the body due to pressure on the distal portion of the flat spring applied by the slider abutting on the distal portion.

10. The card connector according to claim 6, wherein
the flat spring includes:
a basal portion being a plate extending from the cover body in the removal direction; and
a distal portion extending contiguously from and at an angle to the basal portion,
the distal portion of the flat spring is elastically abuttable on the slider located at the second position, and
the basal portion of the flat spring is elastically deformable in a direction away from the body due to pressure on the distal portion of the flat spring applied by the slider abutting on the distal portion.

11. The card connector according to claim 4, wherein
the flat spring includes:
a basal portion being a plate extending from the cover body in the removal direction; and
a distal portion extending contiguously from and at an angle to the basal portion,
the distal portion of the flat spring is elastically abuttable on the slider located at the second position,
the distal portion is elastically deformable in the removal direction when pressed in the removal direction by the slider sliding from the second position to the third position, and
the basal portion of the flat spring is elastically deformable in a direction away from the body due to pressure on the distal portion of the flat spring applied by the slider pressing the distal portion.

12. The card connector according to claim 7, wherein
the body further includes:
a housing portion adjoining the slot in the body, the housing portion housing the slider in a slidable manner; and
a receiving hole on the removal direction side relative to the housing portion in the body, the receiving hole receiving the distal portion of the flat spring.

13. The card connector according to claim 11, wherein
the body further includes:
a housing portion adjoining the slot in the body, the housing portion housing the slider in a slidable manner; and
a receiving hole on the removal direction side relative to the housing portion in the body, the receiving hole receiving the distal portion of the flat spring.

14. The card connector according to claim 12, wherein
the body further includes:
a support portion between the housing portion and the receiving hole of the body, the support portion supporting the basal portion of the flat spring; and
a communicating hole extending through the support portion of the body such that the housing portion communicate with the receiving hole through the communicating hole, and
the slider further includes a projection, the projection being configured to be received in the receiving hole through the communicating hole and elastically abuttable on the distal portion of the flat spring.

15. The card connector according to claim 13, wherein the body further includes:
a support portion between the housing portion and the receiving hole of the body, the support portion supporting the basal portion of the flat spring; and
a communicating hole extending through the support portion of the body such that the housing portion communicate with the receiving hole through the communicating hole, and
the slider further includes a projection, the projection being configured to be received in the receiving hole through the communicating hole and elastically abuttable on the distal portion of the flat spring.

16. The card connector according to claim 12, wherein
the slot and the receiving hole of the body open to one side of a crossing direction that crosses the removal direction and the insertion direction,
the cover body covers the slot from the one side of the crossing direction, and
the distal portion of the flat spring extends from the basal portion to the other side of the crossing direction and is received in the receiving hole from the one side of the crossing direction.

17. The card connector according to claim 13, wherein
the slot and the receiving hole of the body open to one side of a crossing direction that crosses the removal direction and the insertion direction,
the cover body covers the slot from the one side of the crossing direction, and
the distal portion of the flat spring extends from the basal portion to the other side of the crossing direction and is received in the receiving hole from the one side of the crossing direction.

18. The card connector according to claim 14, wherein
the slot and the receiving hole of the body open to one side of a crossing direction that crosses the removal direction and the insertion direction,
the cover body covers the slot from the one side of the crossing direction, and
the distal portion of the flat spring extends from the basal portion to the other side of the crossing direction and is received in the receiving hole from the one side of the crossing direction.

19. The card connector according to claim 15, wherein
the slot and the receiving hole of the body open to one side of a crossing direction that crosses the removal direction and the insertion direction,
the cover body covers the slot from the one side of the crossing direction, and
the distal portion of the flat spring extends from the basal portion to the other side of the crossing direction and is received in the receiving hole from the one side of the crossing direction.

20. The card connector according to claim 1, wherein the cover body and the flat spring are made of a single metal plate.

21. The card connector according to claim 1, wherein
the at least part of the flat spring is so disposed inside the body as to be located on the removal direction side relative to the slider and as to face the slider in the insertion/removal direction of the card.

* * * * *